United States Patent

[11] 3,572,948

| [72] | Inventor | Jean-Michel Catherin<br>Savigny-Sur-Orge, France |
|---|---|---|
| [21] | Appl. No. | 771,788 |
| [22] | Filed | Oct. 30, 1968 |
| [45] | Patented | Mar. 30, 1971 |
| [73] | Assignee | Compagnie Generale D'Electricite<br>Paris, France |
| [32] | Priority | Oct. 31, 1967 |
| [33] | | France |
| [31] | | 126,657 |

[54] APPARATUS FOR MEASURING THE ELECTRON DENSITY OF A PLASMA
3 Claims, 5 Drawing Figs.

[52] U.S. Cl.................................................. 356/204, 331/94.5
[51] Int. Cl..................................................... G01n 21/20, H01s 3/00
[50] Field of Search........................................ 331/94.5; 356/204

[56] References Cited
UNITED STATES PATENTS

| 3,170,122 | 2/1965 | Bennett, Jr. ................. | 331/94.5 |
| 3,174,044 | 3/1965 | Tien .............................. | 331/94.5 |
| 3,228,246 | 1/1966 | Rosenthal..................... | 331/94.5 |
| 3,350,654 | 10/1967 | Snitzer ......................... | 331/94.5 |

OTHER REFERENCES

"Photo Detection & Photomixing of Laser Output" A. T. Forrester, ADVANCES in QUANTUM ELECTRONIC Columbia Univ. Press, Dec. 1961

*Primary Examiner* — Ronald L. Wibert
*Assistant Examiner* — Conrad Clark
*Attorney* — Sughrue, Rothwell, Mion, Zinn and MacPeak

ABSTRACT: A device for measuring the electron density of a plasma. A first laser beam is slowed by a plasma in an amount depending upon the electron density. A second laser beam is mixed with the first to obtain a beat frequency as a function of the electron density.

APPARATUS FOR MEASURING THE ELECTRON DENSITY OF A PLASMA

BACKGROUND OF THE INVENTION

1. Field of the Invention

The present invention pertains to devices for analyzing a plasma.

2. Description of the Prior Art

Many devices are known by which a plasma may be analyzed. All these devices require counting interference fringes, thereby having the disadvantage that they are only precise to within a fringe, which excludes the analysis of plasmas of low concentration.

It is also known to obtain at a cell a beat of two waves, one of which rotates its polarization plane by the Faraday effect, the apparent length of the cavity not being the same for both waves. Two waves of very similar optical frequency are obtained, which are collected at a common cell.

These methods are all limited to fairly high plasma densities, for example of the order of $10^{15}/cm.3$. Those methods which can fall to concentrations of $10^{11}/cm.3$ are rare, and none of them can cover a wide density range. In addition, all these methods present technological difficulties. For example, for preventing the waves from having privileged polarization planes, it is necessary to omit the Brewster windows, which means that only certain types of lasers may be employed. In addition, there is the danger that the laser emission will not commence between the two mirrors of the optical cavity, but will commence on the faces of the end plates of the tube, or on the faces of the plasma tank, which causes the emission to disappear when the measurement is proceeding.

SUMMARY OF THE INVENTION

The present invention accordingly has for its object to reduce the disadvantages presented by the prior art methods and apparatus.

The present invention concerns an apparatus for measuring the electron density of a plasma, comprising a first laser generator, in the optical cavity of which there is disposed a tube containing the plasma, a second laser generator supplying a reference beam, mixing means for combining the beams of the first and second laser generators, a detector for detecting the luminous beat frequency obtained at the outlet of the mixing means, and a means for measuring the frequency which is characteristic of the said plasma density. The invention is characterized by the length $L$ of the optical cavity of the said first laser generator being slightly greater than $C/2\Delta\nu_D$, $C$ being the speed of light and $\Delta\nu_D$ being the width of the Doppler profile of the said first generator, and is also characterized by the measuring means comprising a heterodyne device, at the output of which is disposed a filter whose pass band is equal to $C/2L$.

In accordance with another feature of the present invention, the apparatus for measuring the electron density of a plasma is such that the first laser generator comprises a frequency stabilizing device having a large time constant, which is controlled in accordance with the frequency corresponding the center of the Doppler profile of the first laser generator.

In accordance with a further feature of the present invention, a frequency-voltage-converter is connected to the output of the said filter.

DESCRIPTION OF THE PREFERRED EMBODIMENTS

Figure 1:
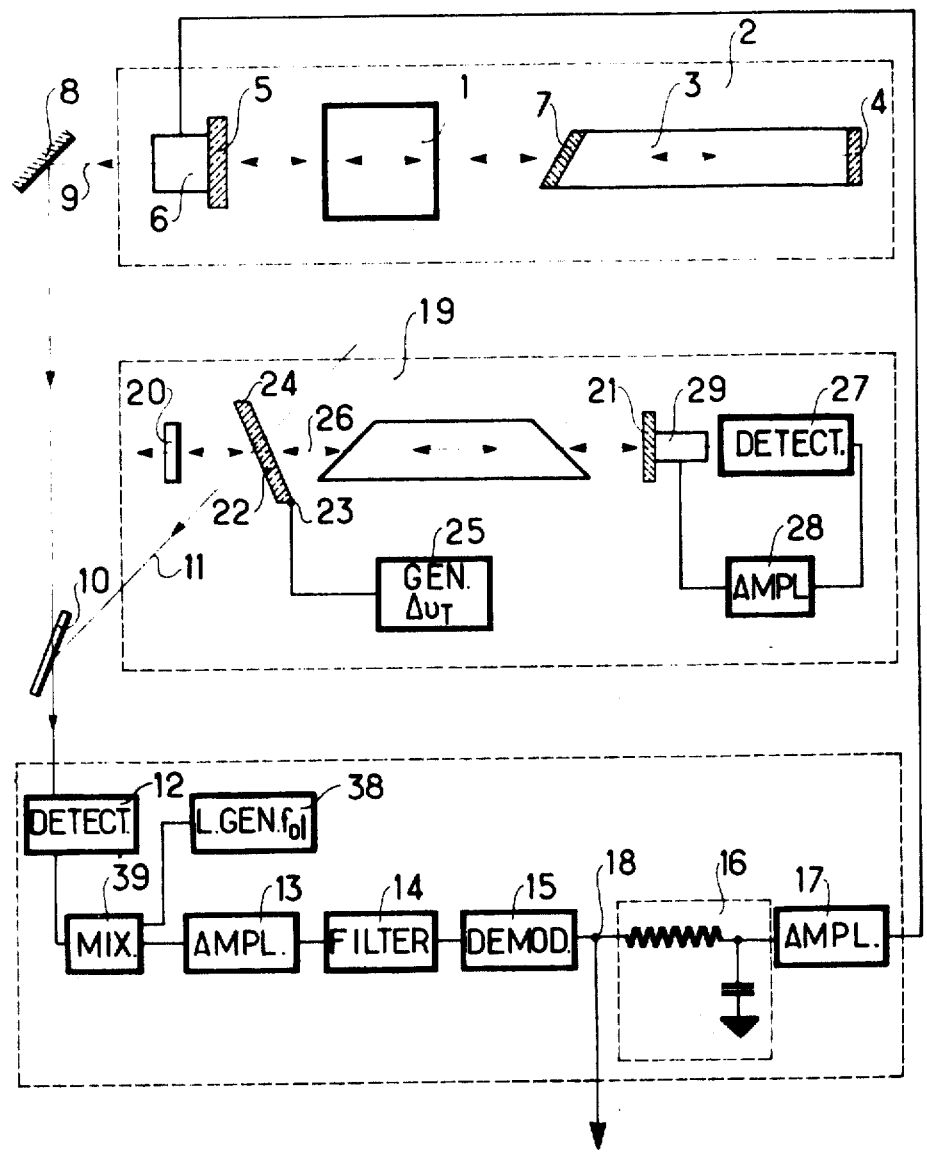
FIG. 1 is a diagram illustrating the principle of the apparatus according the invention.

FIG. 1 is the basic circuit diagram of the apparatus according the invention. A plasma tank 1 is disposed inside a laser cavity 2, which is formed of a totally reflecting mirror 4 secured to a laser tube 3 at one of its ends and having secured to its other end a Brewster plate 7. The cavity is closed by a mirror 5 mounted on a transducer 6, the plasma tank being situated between the said mirror and the Brewster plate 7. The configuration of the mirror 5 depends upon the type of laser employed.

The beam 9 emitted by the laser 2 is deflected by a totally reflecting plate 8 onto a semitransparent plate 10. The laser is stabilized, in the absence of plasma, on a mode of frequency $\nu_o$ by followup control.

An auxiliary beam of 11 of optical frequency $\nu_o\pm<\nu_T$ is mixed by the plate 10 with the beam 9, the sum of these two beams being connected by a photosensitive cell 12. The output of the detector 12 is connected to one of the inputs of a mixer 39, the other input of which is connected to a generator 38 producing a frequency $f_{o1}$. The signal at the output of the mixer 39 is amplified by a wide-band medium-frequency amplifier 13. The output of the amplifier 13 is connected to a steep-edged band-pass filter 14. There is obtained at the output of this filter a frequency-modulated signal injected into a discriminating limiter 15, which supplies a voltage proportional to the frequency of the said modulated signal. This voltage gives information regarding the density of the plasma of the cell 1 and is collected at the output 18 of the discriminator 15.

A part of the signal formed by the said voltage is sent to the transducer 6 through a followup loop comprising a low-pass filter 16 and a device 17 controlling the transducer 6 with a response time greater than the time of analysis of the plasma contained in the tank 1, so as to set the laser at fixed frequency, only when the analysis is complete in order not to disturb the measurement. In fact, the followup control with its low-pass filter is effected only for correcting the slow variations of the frequency of the beam emitted by the laser 2, which are due to a displacement of mirrors, which displacement involves phenomena which vary only slightly during the analyzing time. The followup control may be effected with a delay time which may be, for example, of the order of several tens of milliseconds.

As diagrammatically illustrated in FIG. 1, the reference beam 11 may emanate from an auxiliary laser 19 which emits a beam of fixed frequency $\nu_0$. Disposed between the mirrors 20 and 21 forming the resonating cavity of the laser 11 is a cell comprising a tellurium crystal 22, on which there have been deposited metallized CdS (cadmium sulfide) layer 23 and 24. This cell acted on by a generator 25 supplying a frequency $\Delta\nu_T$ deflects a portion of the beam 26 at 11 in such manner that, for a given orientation of the cell 22, the beam 11 has frequency equal to $\nu_o+\Delta\nu_T$ or $\nu_o-\Delta\nu_T$. This device has the object of producing an optical frequency shift.

The laser 19 comprises a followup loop serving to lock it at the optical frequency $\nu_o$, which consists of a photosensitive cell 27 which collects a portion of the energy of the beam 26 and of a device 28, such as an operational amplifier which acts on a transducer 29 on which the mirror 21 is mounted. The said transducer 29 may be, for example a piezoelectric ceramic element.

In order that the operation of the apparatus diagrammatically illustrated in FIG. 1 may be more readily understood, it is necessary to give a detailed description of the principle employed in the invention to effect the measurement of the electron density of the plasma contained in the tank 1. This plasma, which is obtained, for example, by an electrical discharge, has the effect of varying the apparent length of the cavity of the laser 2, since the optical index of the plasma is generally different from that of the ambient temperature.

If the cavity has a length $L$, the resonance is obtained for a wavelength $\lambda$ such that $$L = q\frac{\lambda}{2} \quad (1)$$

$q$ being an integer.

If $n$ is the index of the plasma disposed in a cavity of length $L$ and if $n=1+\Delta_n$ (2), resonance is produced for a different mode of the same wavelength such that (to an approximation within 0.1 percent)

$$L + L\Delta_n = 2'\frac{\lambda}{2} \quad (3)$$

$q'$ also being an integer, the change from the mode of order to $q$ to the mode of immediately higher order being given by the relation $q' = q-1$ (4).

Figure 2:
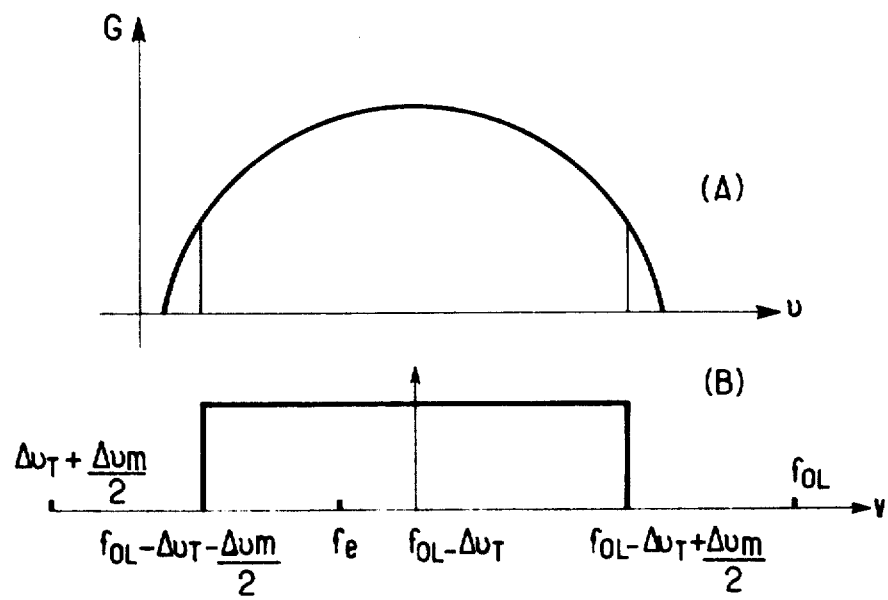
FIG. 2 shows the curve $A$ of the output power of a laser as a function of the Doppler frequency or profile in comparison with the analysis frequencies of the signal and the pass band $B$ of the filter of the electronic chain.

FIG. 2 illustrates the gain curve $E$ of a laser as a function of the frequency $\nu$ of the emitted radiation. This gain curve, which is generally called the Doppler profile, defines a width $\Delta\nu_D$ the laser tube 3 being disposed in a Perot-Fabry cavity, the modes of oscillation of which are defined by the relation $$\Delta\nu_m = \frac{c}{2L}$$

In accordance with the present invention, the width of the cavity is so adjusted that $\Delta\nu_m$ is slightly below $\Delta\nu_D$ defined by the Doppler profile. Thus, one is sure of obtaining at least a mode of oscillation of the cavity which is within the Doppler profile of the laser.

When plasma is created or is present in the tank 1, the apparent length of the cavity will vary. There is a displacement of the modes of oscillation of the laser, which results diagrammatically in a passage of several modes through Doppler profile, one mode disappearing at one end being replaced by another mode at the other end and so on until the apparent length of the laser cavity has reached its maximum or equilibrium value, whereafter it returns to the preceding conditions, on the optical frequency at which the laser 2 is stabilized. This frequency is that of the laser 19 and is so chosen as to be at the center of the Doppler profile of the laser 2.

The modes travelling through the Doppler profile cause a variation of the frequency of the beam 9 which combines with the reference beam 11 to produce a beat which is detected by the cell 12, the signal obtained being mixed with a signal of given frequency $f_{o1}$ supplied by the generator 38.

The sum of these two signals is thereafter amplified, filtered and demodulated by the network 13—14 and 15.

The laser 2 supplies a beam 9 of optical frequency $\nu_2 = \nu_o + \Delta$ when a medium is present which changes the apparent length of the cavity and introduces a shift $\Delta\nu$. The laser 19 in turn supplies, for example, a reference beam $\nu_{19} = \nu_o - \Delta_T$.

The photosensitive cell 12 supplies a beat of frequency $\nu_B$ equal to $\Delta\nu_T \pm \Delta\nu$.

If the local heterodyne generator 38 supplies a frequency $f_{o1}$ which is mixed with the signal $\nu_B = \Delta\nu_T \pm \nu$ in a mixer 39, there is obtained at the output of the latter a mixture of four frequencies, which are $f_e = f_{o1} + \Delta\nu_T \pm \Delta\nu; f_{o1}; \Delta\nu_T + \Delta\nu; f_e = f_{o1} - \Delta\nu_T \pm \Delta <^{'}$ These signals are amplified at 13 by the amplifier tuned to $f_e = f_1 - \Delta\nu_T$ with a pass band higher than $\Delta\nu_m$. At the output of this amplifier, the modulated signals are filtered by the filter 14, the steep-edged pass band of which is in the neighborhood of $\Delta\nu_m$, which is centered on $f_o$.

Since the maximum frequency passing through the filter is $$f_{o1} - \left(\Delta\nu_T - \frac{\Delta\nu m}{2}\right)$$

in order to eliminate $f_{o1}$, it is necessary for $$f_{o1} - \left(\Delta\nu_T - \frac{\Delta\nu_m}{2}\right)$$

to be lower than $f_{o1}$, and therefore $$\Delta\nu_T > \frac{\Delta\nu_m}{2}$$

In order to eliminate $\Delta\nu_T + \Delta\nu$, it is necessary for the minimum frequency passing through the filter $$f_{o1} - \left(\Delta\nu_T + \frac{\Delta\nu_m}{2}\right)$$

to be higher than the frequency $$\Delta\nu_T + \frac{\Delta\nu_m}{2}$$

i.e. $f_{o1} > 2 \Delta\nu_T + \Delta\nu_m$. All these conditions are illustrated in FIG. 2 (B). The discriminating limiter 15 gives an output voltage proportional to the difference between the frequency $f_o$ and the frequency $f_e$ given at a given instant at the output of the filter 14.

$f_e = f_{o1} - \Delta\nu_T \pm \Delta Ax = f_o \Delta\nu.$

Let $\nu$ be this voltage:

$$\nu = k(f_o - f_e),$$

i.e.:

$$\nu = k \Delta\nu \quad (5)$$

This signal collected at the output 18 of the discriminator 15 is a sawtooth signal whose vertical parts correspond to the replacement of one mode by another in the Doppler profile, illustrated by formula (4), this corresponding to a number of successive values of $q$, and the formula (5) representing the amplitude of this signal.

Figure 3:
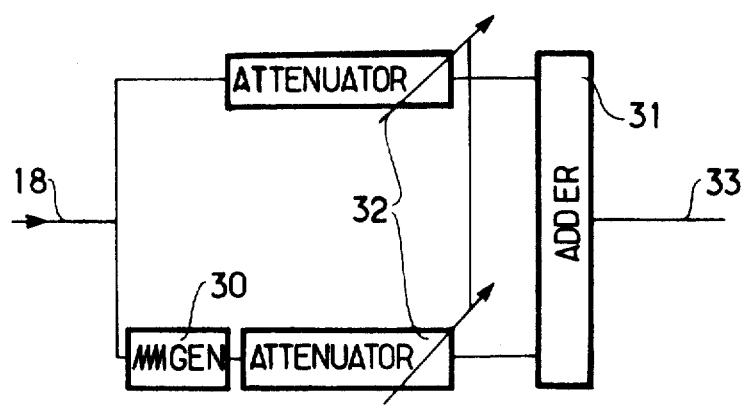
FIG. 3 is a diagram illustrating the principle of the measuring circuit which serves for the processing of the information given by the device illustrated in FIG. 1.

The above-described signal may be processed in various ways, and converted in voltage by addition of the sawtooth pulses with the voltages of a step generator, the device being diagrammatically illustrated in FIG. 3, in which the step generator is shown at 30 and the adder at 31.

Depending upon the electron density of the plasmas, it may be advantageous to provide attenuators 32 coupled to the two circuits in parallel, for example before the adder 31.

Figure 4:
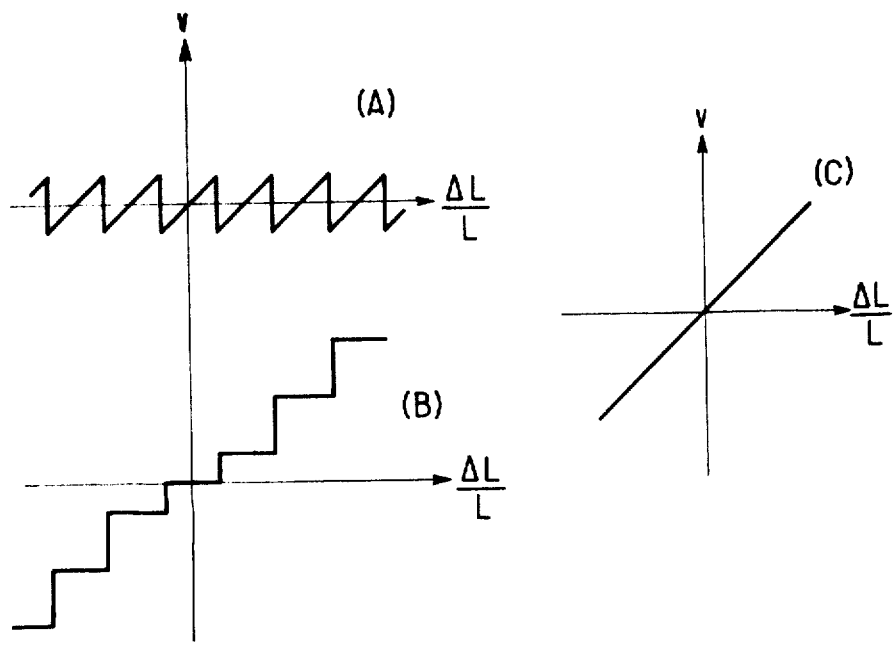
FIG. 4 illustrates the various signals at the level of the information processing.

FIG. 4 illustrates the sawtooth (curve $A$) at the output of the discriminator, the step voltage (curve $B$) at the output of the generator 30, the output voltage of the circuit 33 (curve $C$). The curves are a function of the variations of the length of the cavity or of the variation of index (formula 4), these two variations being proportional.

The steps of the generator 30 are produced as a function of the sawteeth, i.e. the amplitudes are the same as those of the sawteeth and the change from one tooth to another corresponds to the change from one step to another with the corresponding sign. The signal at 33 may be collected on an oscilloscope screen, for example.

Figure 5:
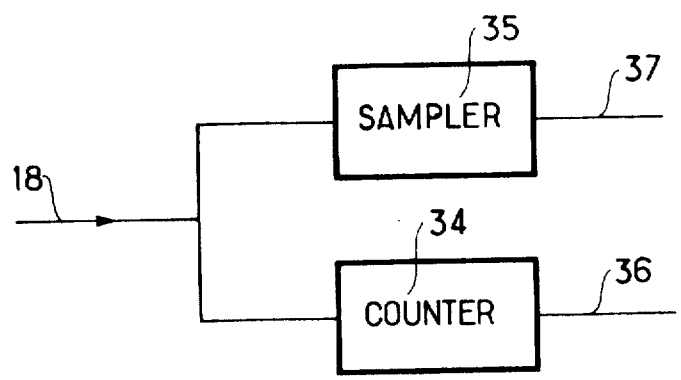
FIG. 5 is a diagram illustrating the principle of another circuit for analyzing the information given by the apparatus according to FIG. 1.

In the case of the apparatus according to FIG. 3, a fairly low precision is obtained at the end of the measurement in the case of high densities, and it is therefore advantageous to replace this circuit with the circuit diagrammatically illustrated in FIG. 5, which comprises in parallel a pulse counter 34 and a sampler 35 which gives the value of the voltage at a predetermined instant and memorizes it. There is obtained at the output 36 the total number of pulses which have passed through the counter and at the output 37 of the value of the voltage, which makes it possible to have a good image of the whole measurement.

Such a device may be constructed, for example, with carbon dioxide gas lasers emitting on 10.6 $\mu$. With such a laser, the bandwidth of which is about 60 m.c./s., we can take a cavity length $$L = \frac{c}{2 \times 50 Mc/s}$$

which gives a length of more than 3 meters. The reference beam will be offset by 50 m.c./s. and with the above-specified conditions the local oscillator will be tuned to 210 m.c./s., and the tuning frequency of the various devices is therefore $f_o = f_{o1} - \Delta x_T = 210 - 50 =$ m.c./s., which results in a pass band of 75 m.c./s. for the photosensitive cell 12.

It is obvious that these figures are a function of the Doppler profile of the laser employed, which in this case is a carbon dioxide gas laser, but this device may be constructed with other types of laser.

With regard to the generator 25, it supplies a frequency of 50 m.c./s. under the above-illustrated conditions.

It is also obvious that the embodiments of the present invention have been described by way of illustrative example having no limiting character and that any modifications of detail may be made therein without departing from its scope or certain means may be replaced by equivalent means. Notably, for technological convenience, it may be found desirable, for example, in the case of $CO_2$ lasers operating at 10.6 $\mu$ to convert this wave to 5.3 $\mu$ with a tellurium crystal, in order to utilize photosensitive cells having pass bands of 200 m.c./s. without severe attenuation. It is also possible to employ a reference beam directly equal to $\nu_o$, for which purpose it is sufficient to modify the electronic network in order to have a correct followup control.

I claim:

1. A device for measuring the electron density of a plasma, comprising:
   a. a first laser generator, comprising an optical cavity in which is disposed a tube containing said plasma and supplying a first beam;
   b. a second laser generator supplying a reference beam;
   c. mixing means for combining the beams of said first and second laser generators to cause a luminous beat frequency;
   d. a detector for detecting the luminous beat frequency obtained at the output of said mixing means; and
   e. heterodyne means for measuring the said frequency, said frequency being characteristic of the said plasma density, said heterodyne means including at the output thereof a filter having a pass band equal to $C/2L$, and wherein the length $L$ of the optical cavity of the said first laser generator is slightly greater than $C/2\Delta\nu_D$, $C$ being the speed of light and $\Delta\nu_D$ being the width of the Doppler profile of said first generator.

2. A device according to claim 1, said first laser generator further comprising a frequency stabilizing device of high time constant, which device is controlled by the frequency corresponding to the center of the Doppler profile of said first laser generator.

3. A device according to claim 1, further comprising a frequency-voltage-converter connected to the output of said filter.